United States Patent Office 3,067,262
Patented Dec. 4, 1962

3,067,262
TELOMERS OF TETRAFLUOROETHYLENE
James Dennis Brady, Wilmington, Del., assignor to E. I. du Pont de Nemours and Company, Wilmington, Del., a corporation of Delaware
No Drawing. Filed May 10, 1961, Ser. No. 108,982
21 Claims. (Cl. 260—653.1)

This invention is directed to novel wax-like solids and dispersions of these solids having significant utility for lubricants, mold release agents, polishes and the like. In particular, the present invention is directed to fluorine containing wax-like solids obtained as dispersions by reacting tetrafluoroethylene in the presence of trichlorotrifluoroethane with an active telogen as hereafter described. This is a continuation-in-part of my application Serial Number 777,217, filed December 1, 1958, now abandoned.

Certain processes for making fluorine containing wax-like solids from tetrafluoroethylene (TFE) are known. In general, the TFE is telomerized in the presence of a telogen and a peroxide catalyst. These known processes, however, generally yield mixtures of low molecular weight liquids, high molecular weight solids, and some intermediate wax-like compositions. To obtain the wax-like fraction, separation steps are required and then it is often difficult or impossible to disperse the fluorowax into a useable form.

It is an object of the present invention to provide a novel process for preparing fluorinated wax-like solids without attendant formation of non-wax-like fractions; this invention unexpectedly enables one to control the telomerization of TFE to obtain only those products which have the molecular weight range required for wax-like properties. It is a further object of this invention to provide a process which directly yields a useful fluorinated wax-like solid as a dispersion. It is a still further object to provide novel fluorinated wax-like solid dispersions which may be used in a variety of ways for numerous applications without resorting to special techniques.

These and other objects will be apparent in the following specification and claims.

More specifically, the present invention is directed to novel wax-like materials which are the normally solid, essentially non-distillable, open-chain, highly crystalline reaction products of tetrafluoro-ethylene and a solution of an active telogen in trichlorotrifluoroethane in the presence of a free radical generating catalyst having a number average molecular weight in the range 1300 to 15,000, a crystalline melting point in the range 225° to 320° C., specific infra-red ratios at 3.4 microns of from 0.05 to 3.5 and at 10.4 microns of from 0.05 to 3.0, a chlorine content of from 0.05% to 2.0% by weight, a hydrogen content of from 0.05% to 2.0% by weight and a lamellar arrangement of sheet-like crystals, these terms being defined below.

The usual methods for determining the number average molecular weight, viz., freezing point depressions or boiling point elevations, are not applicable to the compositions of the present invention due to their extreme insolubility and chemical inertness. The number average molecular weights are therefore determined by either end group analysis or based on the crystalline melting points of the products using the relationship derived by Flory as described in his text book "Principles of Polymer Chemistry," published by the Cornell University Press. The equation described in Chapter 13 is $$\frac{1}{T_m} - \frac{1}{T_m^\circ} = \left[\frac{R}{\Delta H_u}\right]\left[\frac{2}{\overline{X}_n}\right]$$

wherein $T_m$ is the crystalline melting point in ° K., $T_m^\circ$ is the melting point of pure $CF_2$ polymer (600° K.), $R$=gas constant (2.0 calories/mole degree), $\Delta H_u$=heat of fusion per mole of $CF_2$ units (685 calories) and $\overline{X}_n$=number average of $CF_2$ units. Since the weight of the $CF_2$ unit is 50, the number average molecular weight $(M_n)$ of the present products becomes $M_n=50\overline{X}_n$. By substitution of the above values in the equation of Flory, it reduces to $$\overline{M}_n = \frac{200}{685\left[\dfrac{1}{T_m} - \dfrac{1}{600}\right]}$$

The crystalline melting point of a product is the point where the last traces of crystallinity disappear. This point can be determined in several ways, viz., the loss of birefringence as observed through crossed polarizers of a hot stage microscope, by taking X-ray diagrams at various temperatures and noting the temperature at which the crystalline diffraction rings completely disappear or by the dilatometric method (see Tobolsky, "Properties and Structures of Polymers," Wiley, 1960, pp. 46–47). The first method is most convenient and is used throughout the present specification.

The term specific infrared ratio at 3.4 microns as used herein refers to the net absorbance in the infrared at a wavelength of 3.4 microns divided by the net absorbance in the infrared at a wavelength of 4.3 microns of a film of approximately 0.1 mm. thickness. Such films are obtained by pressing a dry powder sample of the product at room temperature and a pressure of 20,000 to 40,000 p.s.i. The term "net absorbance" means the total absorbance corrected for any background absorbance. To determine the net absorbance, a line is drawn at the level of the background absorbance and the distance to the peak is measured. The technique is more fully described in Weissberger, "Techniques of Organic Chemistry," 2nd Ed., vol. 1, pt. II, pp. 1295–1299; Lothian "Absorption Spectrophotometry" pp. 19–23, Wright, Anal. Chem., 13, 1 (1941) and Heigl et al., Anal. Chem., 19, 293 (1947).

In carrying out the determinations, the film is mounted between sodium chloride plates and the absorbance spectrum is determined in the conventional way in a nitrogen atmosphere using an infrared spectrophotometer fitted with sodium chloride optics. The specific infrared ratio at 3.4 microns is related to C-H content of the product.

The specific absorbance of 10.4 microns is determined in the same manner by dividing the net absorbance at 10.4 microns by the net absorbance at 4.3 microns. This absorbance is related to the chlorine content of the product.

X-ray diffraction patterns of the products of this invention show that they are well ordered products possessing a high degree of crystallinity with essentially no amorphous structure. The general method for estimating the relative amount of amorphous and crystalline material by X-ray diffraction is well known (see, Billmeyer, "Textbook of Polymer Chemistry," Interscience Publishers, 1957, pp. 33–34).

The very thin, sheet-like, lamellar structure of the products is shown by electron microphotographs prepared by conventional electronmicroscopy techniques. By shadow casting techniques, the individual sheet-like crystals have been shown to have thicknesses of the order of 100 angstrom units or less.

The term "active telogen" utilized according to the present invention describes a telogen which, on reaction with tetrafluoroethylene without solvent, produces low molecular weight products whose molecules contain predominantly one or two tetrafluoroethylene units per active telogen unit. Such active telogens are well known in the art and include numerous compounds. Representative active telogens are tertiary hydrocarbons such as isobutane, methylcyclopropane, 2,3-dimethylbutane, methylcyclohexane, etc.; aliphatic ethers with alpha hydrogen atoms such as tetrahydrofuran, diethylether, dioxane, etc.; tertiary aliphatic amines such as trimethylamine, triethylamine, etc.; aliphatic alcohols containing an alpha hydrogen such as methanol, ethanol, isopropanol, sec-butyl alcohol, cyclohexanol, etc.; bivalent aliphatic sulfur compounds such as ethyl mercaptan, dimethyldisulfide, diethyldisulfide, dipropyldisulfide, etc.; aliphatic carbonyl compounds such as aldehydes, ketones, diketones, acids, esters, etc. containing an alpha hydrogen atom such as acetaldehyde, acetone, methyl ethyl ketone, 2,4-pentanedione, ethyl acetoacetate, isobutyric acid and the like; dialkyl phosphites such as dimethyl phosphite and diethyl phosphite and dialkylamides such as dimethylformamide. Each type of telogen leads to a type of product which differs in some respects from other types.

The products obtained from tertiary hydrocarbons are normally a solid, essentially non-distillable, open-chain, highly crystalline reaction products of tetrafluoroethylene and a solution of a tertiary aliphatic or cycloaliphatic hydrocarbon free of aromatic groupings in trichlorotrifluoroethane in the presence of a free radical generating catalyst having a number average molecular weight in the range of 2500 to 15,000, a crystalline melting point in the range of 285° to 320° C., specific infrared ratio at 3.4 microns of from 0.2 to 3.5 and at 10.4 microns of from 0.1 to 2.0, a chlorine content of from 0.05 to 2.0% by weight, a hydrogen content of from 0.05 to 1.0% by weight and a lamellar arrangement of sheet-like crystals.

The products obtained from aliphatic alcohols are normally solid, essentially non-distillable, open-chain, highly crystalline reaction products of tetrafluoroethylene and a solution of a primary or a secondary aliphatic or cycloaliphatic alcohol in trichlorotrifluoroethane and the presence of a free radical generating catalyst having the number average molecular weight in the range 1800–15,000; a crystalline melting point in the range 275° to 320° C.; specific infrared ratios at 2.9 microns of 0.1 to 2.0, at 3.4 microns of from 0.05 to 2.0, and at 10.4 microns of from 0.05 to 2.0; a chlorine content of from 0.05 to 2.0% by weight; a hydrogen content of from 0.05% to 1.0% by weight; and a lamellar arrangement of sheet-like crystals. The specific infrared ratio at 2.9 microns is determined as previously described for the ratios at 3.4 microns and 10.4 microns, it being the ratio of the net absorbance at 2.9 microns to the net absorbance at 4.3 microns. This ratio is related to the hydroxyl group conetent of the product.

The products obtained from divalent sulfur compounds are normally solid, essentially non-distillable, open-chain, highly crystalline reaction products of tetrafluoroethylene and a solution of a divalent sulfur compound in trichlorotrifluoroethane in the presence of a free radical generating catalyst having a number average molecular weight in the range 1,300 to 15,000; a crystalline melting point in the range 255° to 320° C.; specific infrared ratios at 3.4 microns of from 0.05 to 2.0, at 10.4 microns of from 0.1 to 3.0; a chlorine content of from 0.05 to 2.0% by weight; a hydrogen content of from 0.05 to 1.0% by weight; a sulfur content of from 0.2 to 5.0% by weight; and a lamellar arrangement of sheet-like crystals.

The products obtained from aliphatic tertiary amines are normally solid, essentially non-distillable, open-chain, highly crystalline reaction products of tetrafluoroethylene and a solution of an aliphatic tertiary amine in trichlorotrifluoroethane in the presence of a free radical generating catalyst having a number average molecular weight in the range 1800 to 15,000; a crystalline melting point in the range 275° to 320° C.; specific infrared ratios at 3.4 microns of from 0.05 to 3.5 and at 10.4 microns of from 0.05 to 2.0; a chlorine content of from 0.05 to 2.0% by weight, a hydrogen content of from 0.05 to 2.0% by weight, a nitrogen content of from 0.1 to 1.5% by weight and a lamellar arrangement of sheet-like crystals.

The products obtained from aliphatic ethers are normally solid, essentially non-distillable, open-chain, highly crystalline reaction products of tetrafluoroethylene and a solution of an aliphatic ether of a primary or secondary aliphatic or cycloaliphatic alcohol in trichlorotrifluoroethane in the presence of a free radical generating catalyst having the number average molecular weight in the range 1300 to 15,000; a crystalline melting point in the range 255 to 320° C.; specific infrared ratios at 3.4 microns of 0.05 to 3.5, at 10.4 microns of from 0.05 to 3.0; a chlorine content of 0.05 to 2.0% by weight; a hydrogen content of from 0.05 to 2.0% by weight; and a lamellar arrangement of sheet-like crystals.

The products obtained from carbonyl compounds are normally solid, essentially non-distillable, open-chain, highly crystalline reaction products of tetrafluoroethylene and a solution of an aliphatic or cycloaliphatic carbonyl compound in trichlorotrifluoroethane in the presence of a free radical generating catalyst having a number average molecular weight in the range 1500 to 15,000; a crystalline melting point in the range of 275° to 320° C.; specific infrared ratio at 3.4 microns of 0.1 to 3.5, and at 10.4 microns of 0.1 to 3.0; a chlorine content of 0.05 to 2.0% by weight; a hydrogen content of 0.05 to 2.0% by weight; and a lamellar arrangement of sheet-like crystals.

The products obtained from dialkyl phosphites are normally solid, essentially non-distillable, open-chain, highly crystalline reaction products of tetrafluoroethylene and a solution of a dialkyl phosphite in trichlorotrifluoroethane in the presence of a free radical generating catalyst having a number average molecular weight in the range 1300 to 15,000; a crystalline melting point in the range 255° to 320° C.; specific infrared ratios at 3.4 microns of 0.05 to 2.5, at 10.4 microns of 0.05 to 2.0; a chlorine content of from 0.05 to 2.0% by weight; a hydrogen content of from 0.05 to 2.0% by weight; a phosphorus content of from 0.1 to 3.5% by weight; and a lamellar arrangement of sheet-like crystals.

The novel dispersions of the present invention are obtained by use of telomerization techniques, as described, for example, in U.S. Patent 2,540,088. In general, the telomerization is carried out by either batch or continuous processes. The batch process is carried out by first charging an autoclave or other pressure vessel with an active telogen, with trichlorotrifluoroethane, with a free radical generating catalyst and then introducing tetrafluoroethylene gas under pressure or by passing it into the cooled reactor. The closed reaction vessel is then heated to a temperature between 75° and 200° C. and the reaction allowed to proceed. Pressures will be generated between about 300 and 600 p.s.i.g. and as the reaction nears completion, the pressure within the system will be observed to drop. Conventional continuous procedures may also be used as illustrated by several examples of the instant specification.

In order to obtain the useful dispersions of this invention it is necessary to carefully control the amounts of tetrafluoroethylene, trichlorotrifluoroethane and active telogen. For each mole of tetrafluoroethylene, it is necessary to have present, in the reaction mass, 1.7 to 15 moles of trichlorotrifluoroethane, and from about 0.01 to about 0.6 mole of active telogen. If less than 0.01 mole of active telogen is used, the product is of higher molecular weight and is less wax-like, approaching, as the telogen is decreased, polytetrafluoroethylene itself. If much above 0.6 mole active telogen is used per mole of tetrafluoroethylene, the molecular weight becomes too low and the properties of the product progress from wax-like to grease-like to liquid as the amount of active telogen increases. These lower molecular weight materials are useful, however, as replacements for the known silicone fluids which have water repellent properties, but which lack good oil repellent properties and which are used where liquid products are desired. On the other hand, if much more than 15 moles of trichlorotrifluoroethane is used per mole of tetrafluoroethylene, the dispersion is too dilute for practical purposes. If less than about 1.7 moles of the trichlorotrifluoroethane is used, the viscosity of the resultant product is very high, resulting in poor heat transfer during preparation which in turn makes longer reaction times required. It is important to carry out the process within the ratios described to obtain the present novel dispersion.

It has been established by chemical analysis that the trichlorotrifluoroethane takes part in the telomerization process; said trichlorotrifluoroethane acts as a telogen to some extent. Thus, it follows that the wax-like products obtained are probably mixtures of telomers containing the reaction products of tetrafluoroethylene with trichlorotrifluoroethane as well as the active telogens. The final products, then are dispersions of these wax-like compounds in the trichlorotrifluoroethane.

The trichlorotrifluoroethane may be either isomer; i.e., it may be 1,1,1-trichloro-2,2,2-trifluoroethane or 1,1,2-trichloro-1,2,2-trifluoroethane; it is preferred to use the latter isomer.

The active telogen, although present in very small amounts, contributes significantly to the obtaining of the fluorowax without undesirable by-products. If the telomerization is carried out without the active telogen, high molecular weight products resembling polytetrafluoroethylene are obtained which are not wax-like. The presence of the active telogen in the amounts specified results in products having average molecular weights in the order of from 1300 to 15,000 and which have wax-like properties.

As indicated, the reaction is carried out with a free radical initiator as the catalyst This catalyst may be any organic peroxide, azo compound or the like which generates free radicals at the reaction temperature. Based on availability of catalysts and convenience, temperatures of about 75° C. to about 200° C. will usually be used and the catalyst employed will be chosen according to its ability to generate free radicals at the specific temperature selected. The catalyst usually employed will be $\alpha,\alpha'$-azobisisobutyronitrile, benzoyl peroxide, ditertiarybutyl peroxide, or the like. With ditertiarybutyl peroxide, which is preferred catalyst, temperatures of about 130° C.–160° C. will be used. The concentration of catalyst taken will usually be in the range of .05% to 3% by weight of TFE, the preferred amount being about 2%.

In a batch process, as the reaction proceeds, autogenous pressure builds up within the system to about 600 p.s.i.g. As the reaction comes to completion the pressure decreases and usually remains steady at about 250 p.s.i.g. Normally the reaction is completed in about one to three hours.

In a continuous system, a constant reaction pressure is maintained. A solution of the active telogen and the free radical catalyst in trichlorotrifluoroethane is fed continuously into a liquid full, stirred autoclave. Tetrafluoroethylene is compressed and also fed continuously into the autoclave. Product is continuously discharged from the autoclave through an automatic pressure release device which maintains the reaction pressure in the range of 400 to 600 p.s.i.g.

The reaction product obtained is a dispersion containing about 5% to 20% solids depending upon the amount of trichlorotrifluoroethane taken. This dispersion may be used "as is," if desired. The article to be treated is simply dipped, sprayed, or coated by other conventional means. After the liquid trichlorotrifluoroethane evaporates a fluorinated wax-like coating remains on the surface. This wax-like coating has a very low coefficient of friction, is durable and gives a smooth glossy finish on buffing.

In an alternate embodiment, the novel dispersions of the present invention may be used in aerosol formulations whereby it is expelled from a container by aerosol propellents. If a paste type wax-like material is desired, the liquid tetrachlorotrifluoroethane is simply distilled off until the desired consistency is obtained. Usually a paste type material containing about 20% solids by weight will be selected as most satisfactory.

The wax-like dispersion "as is," in the form of a paste or as an aerosol formulation is of value for use as polishes, friction reducing compositions, mold release agents, dry lubricants and as soil repellents. Particular uses will be for automobiles, furniture, boats, skis and other sporting equipment, paper, glass, industrial machinery and the like. When applied to any surface such as wood, metal, glass, paper, leather, plastics, etc. by spraying, coating, dipping, etc. the wax shows excellent substantivity, lubricity and durability.

Some specific uses for the novel wax-like compositions are as an ammunition lubricant, a pipe thread lubricant, mold release agent, a coating for golf clubs and balls to make cleaning easier, a coating for threads and ropes, as a dance floor and bowling alley wax, and as the wax ingredient for shoe, furniture, automobile, leather, linoleum and other polishes. As an anti-sticking agent, the wax may be used on snow and other shovels, on plows, on irons to make ironing easier, on sticking doors, windows, and sliding drawers, and on lawnmowers to prevent sticking of grass clippings. The wax may also be used to waterproof paper, textiles, wood, painted surfaces and it also imparts oil repellent properties to surfaces treated with it. Other uses are described hereinafter. Other varied uses will be apparent to those skilled in the art.

The following representative examples illustrate the present invention; all parts are by weight.

*Example I*

A silver lined reactor was flushed with nitrogen and carged with 200 parts (1.06 moles) of 1,1,2-trichloro-1,2,2-trifluoroethane, 1.5 parts (0.015 mole) of methylcyclohexane and 0.8 part of di-tertbutyl peroxide. The reactor was cooled to Dry Ice temperature and 40 parts (0.4 mole) of tetrafluoroethylene (TFE) was added. (Mole ratio of trichlorotrifluoroethane to TFE=2.7:1 and mole ratio of active telogen to TFE=0.4:1.) The vessel was closed and heated to 130° C. and shaken for 8 hours during which time the pressure first rose to 400 p.s.i.g. and then fell to 200 p.s.i.g. After cooling, the product was removed from the reaction vessel and consisted of 216 parts of a thick wax dispersion containing 22.5% by weight of the fluorowax in the trichlorotrifluoroethane. On evaporation of the trichlorotrifluoroethane from a small sample of the dispersion, a white, solid wax-like product remained which has a crystalline melting point of 298° C. A thin film pressed from this material had a specific infrared ratio of 3.4 microns of 1.38 and at 10.4 microns of 1.35. Elemental analysis indicated the presence of 1.1% by weight chlorine and of 0.4% by weight hydrogen. The number average molecular weight was 3500.

This dispersion was applied to a linoleum tile. It dried quickly to a hard coating which was readily buffed to a very slippery, glossy, water and oil resistant finish.

This material was formulated into an aerosol package by adding to 11 grams of the 22.5% dispersion in an aerosol can, 239 grams of a propellant mixture of a 1:1 mixture of $CCl_3F$ and $CCl_2F_2$. When this material was sprayed from the can onto a steel surface, a coating was laid down which was readily buffed to a hard, very slippery, glossy oil and water resistant finish.

*Example II*

A stainless steel agitated autoclave was filled with 1.2 liters of a solution of 1,1,2-trichloro-1,2,2-trifluoroethane (1.8 kg.=9.7 moles) containing 0.75% by weight of methylcyclohexane (13.8 g.=0.14 mole) and 0.4% of ditertbutyl peroxide (7.4 g.=0.05 mole). The reactor was closed and heated to 130° C., the pressure rising to 450 p.s.i.g. Then gaseous TFE was compressed and fed into the reactor at a rate of 3 moles per hour as the solution of other reactants was continuously passed into the reactor keeping it full. The pressure was maintained at 450 p.s.i.g. by a gradual release of product as it was formed. Useful product was formed after about one hour of operating time. After 5.5 hours, 14.28 kg. of dispersion was collected. The product dispersion, which contained 5% by weight of fluorinated wax-like solid was concentrated by distilling off, at atmospheric pressure, a part of the trichlorotrifluoroethane until a paste containing 20% solids was obtained. Complete evaporation of a sample of the dispersion yielded a wax-like solid having a crystalline melting point of 294° C., a number average molecular weight of 3100, a specific infrared ratio at 3.4 microns of 1.99 and at 10.4 microns of 1.31. It contained 1.2% by weight chlorine and 0.6% by weight hydrogen.

*Example III*

An agitated stainless steel autoclave was filled with 1.5 liters of a solution of 1,1,2-trichloro-1,2,2-trichloroethane, 0.42% by weight of isopentane and 0.21% by weight of di-tertiary-butyl peroxide. The reactor was closed and heated to 160° C. Gaseous tetrafluoroethylene was compressed and fed into the reactor which was maintained at a pressure of 600 lbs./sq. in. The tetrafluoroethylene was fed continuously at a rate of 361.2 g./hr. while the solution of the other reactants was continuously passed into the reactor at a rate of 1748 g./hr. The pressure was maintained at 600 lbs./sq. in. by a gradual release of product. The reaction reached steady state conditions after approximately three hours. The overall time of the preparation was 7.0 hrs., and, during the last 3 hrs. when the reaction was at steady state conditions, the average conversion of the tetrafluoroethylene to product was 87.6%. The dispersion formed during this period of the last 3 hrs. contained 16.8% by weight of the solid product. Removal of the 1,1,2-trichloro-1,2,2-trifluoroethane from the product collected during the last 3 hrs. of preparation gave a white, solid wax-like material which possessed a number average molecular weight of 3700, a crystalline melting point of 300° C., a specific infrared ratio at 3.4 microns of 0.47 and a specific infrared ratio at 10.4 microns of 0.93. Elemental analysis showed that the solid product contained 0.72% by weight chlorine and 0.17% by weight hydrogen.

Application of the dispersion of this product to a stainless steel plate followed by drying at 100° C. gave a coating which was not wetted by water or by petroleum white oil. The solid product was found to be an excellent lubricant for door latches, and for glides of wooden drawers.

*Example IV*

Example III was repeated using a solution of 1,1,2-trichloro-1,2,2-trifluoroethane containing 0.287% by weight of methylcyclohexane and 0.214% by weight of ditertiary-butyl peroxide. The reaction was conducted at 160° C. at a pressure of 600 lbs./sq. in. for 7 hrs. during which time tetrafluoroethylene was fed at a rate of 361.2 g./hr. and the 1,1,2-trichloro-1,2,2-trifluoroethane solution was fed at a rate of 1759 g./hr. Essentially steady state conditions were reached after the first three hours of reaction and the product which formed thereafter was a dispersion of the white, wax-like solid in the 1,1,2-trichloro-1,2,2-trifluoroethane in a concentration of 16.2% active ingredient. During the last three hours of reaction, the tetrafluoroethylene was converted to an extent of 91.2% to the wax-like product. Removal of the volatile reaction medium from the sample of this dispersion gave a white, solid, wax-like product having a number average molecular weight of 6100, a crystalline melting point of 310° C., a specific infrared ratio at 3.4 microns of 0.32 and at 10.4 microns of 1.6. This white, solid product contained 0.88% by weight chlorine and 0.15% by weight hydrogen.

When the above process was carried out using a feed solution containing 0.584% by weight of methylcyclohexane and 0.214% by weight of di-tertiary-butyl peroxide and 1,1,2-trichloro-1,2,2-trifluoroethane at a reaction temperature of 180° C. and the other reaction conditions as described above the product was formed with 86.4% of the tetrafluoroethylene being converted to product. The resulting dispersion contained 14.7% solids. The white solid wax-like product exhibited a number average molecular weight of 3600 and a crystalline melting point of 299° C. It has a specific infrared ratio at 3.4 microns of 0.66 and at 10.4 microns of 1.53 while elemental analysis showed that it contains 1.43% by weight chlorine and 0.15% by weight hydrogen.

*Example V*

A 1.43 liter stainless-steel autoclave equipped with Magna-Dash agitator unit was filled liquid full with a solution of 1,1,2-trichloro-1,2,2-trifluoroethane containing 0.5% by weight dimethyldisulfide and 0.3% by weight di-tertiary-butyl peroxide. The reactor was closed and heated to 145° C. Gaseous tetrafluoroethylene compressed to 600 p.s.i. was then introduced into the agitated solution at a rate of 0.036 cut.ft./min. in a continuous manner while the liquid feed solution was continuously passed into the reactor at a rate of 62 grams per minute with the reactor being kept liquid full at all times. The pressure was maintained at 600 p.s.i. by a gradual release of the product at it was formed. After the reacting mixture was at essentially equilibrium conditions and the reaction was at essentially steady state, the product was formed at conversion of 85% of the tetrofluoroethylene. The product was discharged from the reactor as a dispersion of the while solid wax-like solid in 1,1,2-trichloro-1,2,2-trifluoroethane with the dispersion containing 7.5% by weight of the solid. The solid wax-like product obtained by evaporation of the liquid medium had a crystalline melting point of 295° C. The number average molecular weight of the product was 3.100. Elementarl analysis showed that the solid contained 2.7% sulfur, 0.3% hydrogen, and 0.1% chlorine. The specific infrared ratio at 3.4 microns was 0.55 and the specific infrared ratio at 10.4 microns was 1.26. X-ray diffraction spectra of this product indicated a high degree of crystallinity. Electron photomicrographs reveal the lamellar crystal structure.

*Example VI*

A stainless steel autoclave having a capacity of 1.5 liters and equipped with a mechanically operated agitator was filled with a solution of 1,1,2-trichloro-1,2,2-trifluoroethane containing 1.54% by weight dimethyldisulfide and 0.60% by weight di-tertiary-butyl peroxide. The reactor was closed and heated to 145° C., and then gaseous tetrafluoroethylene compressed to 600 p.s.i. was fed into the reactor at a rate of 425 grams per hour in a continuous manner. At the same time the liquid feed solution was fed continuously at a rate of 1,728 grams per hour so that the reactor was maintained liquid full. The pressure of 600 p.s.i. was maintained by a gradual release of product corresponding to the amount of material fed into the reactor. After four hours, equilibrium was established, and the system was determined to be at essentially steady state condition. The product was a dispersion of a white wax-like solid in a concentration of 18.8% active ingredient in 1,1,2-trichloro-1,2,2-trifluoroethane. While at steady state conditions, the conversion of tetrafluoroethylene to solid product was 98.2%.

The white wax-like solid obtained on evaporation of the 1,1,2-trichloro-1,2,2-trifluoroethane had a crystalline melting point of 279° C.; a number average molecular weight of 2,000; contained 0.2% hydrogen, 0.3% chlorine, and 2.2% sulfur; and had specific infrared ration at 3.4 microns and 10.4 microns of 0.42 and 1.80 respectively.

Example VII

A 1.43 liter stainless steel autoclave equipped with a Magna-Dash agitator unit was filled liquid full with a solution of 1,1,2-trichloro-1,2,2-trifluoroethane containing 0.497% by weight methanol and 0.14% by weight di-tertiary-butyl peroxide. The reactor was closed and heated to 140° C. Gaseous tetrafluoroethylene, compressed to 600 lbs./sq. in., was then introduced into the agitated solution at a rate of 4.69 g./min. in a continuous manner while the liquid feed solution was continuously passed into the reactor at a rate of 52 g./min. with the reactor being kept liquid full at all times. The pressure was maintained at 600 lbs./sq. in. by a gradual release of product at it was formed. After the reacting mixture was at essentially equilibruim conditions and reaction was at essentially steady state, the product was formed in a conversion of 63% of the tetrafluoroethylene. The product was discharged from the reactor as a dispersion of a white wax-like solid in the 1,1,2-trichloro-1,2,2-trifluoroethane with the dispersion containing 7.1% by weight of the solid.

Isolation of a sample of the solid by evaporation of the liquid medium yielded a white, hard wax-like solid which exhibited a crystalline melting point of 312° C. and possessed a number average molecular weight of 6800. It contained 0.26% by weight chlorine and 0.13% by weight hydrogen. The specific infrared ratios at 2.9 microns, at 3.4 microns and at 10.4 microns were 0.56, 0.18 and 0.35 respectively. The X-ray diffraction spectra of this product showed a high degree of crystallinity and no evidence of amorphous material. Electron photomicrographs reveal the lamellar crystal structure.

Another reaction carried out in the same manner except that the concentration of methyl alcohol in the 1,1,2-trichloro-1,2,2-trifluoroethane solution was 0.99% by weight and that of the di-tiertiary-butyl peroxide was 0.28% by weight. The feed rate of the tetrafluoroethylene in the continuous reaction was 2.65 g/min. while the feed rate of the liquid solution was 62 g./min. After reaching steady state conditions (approximately 3 hrs.), the conversion of tetrafluoroethylene to the white wax-like solid was 53%, and the product dispersion contained 3.7% by weight of the solid. The solid isolated by evaporation of the liquid medium was found to have a number average molecular weight of 4600, a crystalline melting point of 305° C., and specific infrared ratios at 2.9, 3.4, and 10.4 microns of 0.90, 0.26, and 0.55 respectively. This product contained 0.54% by weight chlorine and 0.27% by weight hydrogen according to the elemental analysis. X-ray diffraction showed this product to be highly crystalline.

Example VIII

A stainless steel autoclave equipped with a mechanically operated agitator and having a capacity of 1.5 liters was filled with a solution of 1,1,2-trichloro-1,2,2-trifluoroethane containing 3.7% by weight methanol and 1.04% by weight di-tertiary-butyl peroxide. The reactor was closed and heated to 160° C., and then compressed gaseous tetrafluoroethylene at 600 p.s.i.g. was fed into the reactor at a rate of 425 g./hr. in a continuous manner. At the same time the liquid solution was fed continuously at a rate of 1500 g./hr. so that the reactor was kept liquid full. The pressure of 600 lbs./sq. in. was maintained by a gradual release of product corresponding to the amount of material fed into the reactor. After 4 hrs. equilibrium was established and the system was determined to be at essentially steady state conditions. The product was a dispersion of the white wax-like solid in a concentration of 18.8% in 1,1,2-trichloro-1,2,2-trifluoroethane. During the last 10 hrs. of the reaction, the conversion of tetrafluoroethylene to product was 72.9%. The solid product thus formed had a number average molecular weight of 2000, a crystalline melting point at 278° C., contained 0.60% by weight chlorine and 0.17% by weight hydrogen, and had specific infrared ratios at 2.9, 3.4, and 10.4 microns of 1.76, 0.38, and 0.96 respectively.

Example IX

Example VIII was repeated using a solution of 1,1,2-trichloro-1,2,2-trifluoroethane containing 0.5% by weight triethylenediamine (in place of methanol) and 0.25% by weight di-tertiary-butyl peroxide. The reaction vessel and contents were heated to 143° C. and maintained within ±5° C. of that temperature throughout the reaction. Gaseous tetrafluoroethylene was compressed at 600 p.s.i. and introduced into the agitated reaction solution at a rate of 4.69 grams per minute in a continuous manner while the liquid feed solution was continuously passed into the reactor at a rate of 50 grams per minute with the reactor being kept liquid full at all times. The dispersion of the solid product in 1,1,2-trichloro-1,2,2-trifluoroethane, after the reaction had reached essentially steady state conditions was present in a concentration of 5.4%. The tetrafluoroethylene conversion was 35%.

The solid product isolated by evaporation of the reaction medium was tan in color. It had a crystalline melting point of 297° C. The product had a specific infrared ratio of 3.4 microns of 1.20 and a specific infrared ratio at 10.4 microns of 0.94. Elemental analysis showed that the product obtained 0.88% by weight chlorine, 1.0% by weight hydrogen, and 2.0% by weight nitrogen. The number average molecular weight was 3400.

Example X

A silver-lined pressure vessel was flushed with dry nitrogen and charged with 200 parts of 1,1,2-trichloro-1,2,2-trifluoroethane, 2.0 parts of N,N-dimethylformamide, 0.8 part of di-tertiary-butyl peroxide and after cooling and evacuating with 40 parts of tetrafluoroethylene. The reaction vessel was closed and heated to 130° C. for 2½ hrs. so that the mixture was allowed to react at autogenous pressure. After cooling to room temperature, the pressure vessel was opened and the dispersion of white, waxy solid in the 1,1,2-trichloro-1,2,2-trifluoroethane was removed. The solid isolated from this dispersion had a crystalline melting point of 300° C. The number average molecular weight was 3700. At 3.4 microns, the specific infrared ratio was 0.86, at 10.4 microns, the specific infrared ratio was 0.36. Elemental analysis indicated a chlorine content of 0.25% by weight, a hydrogen content of 0.32% by weight, and a nitrogen content of 0.50% by weight.

Example XI

A silver-lined reactor was flushed with nitrogen and charged with 200 parts of 1,1,2-trichloro-1,2,2-trifluoroethane, 5.0 parts of diethyl ether, and 0.8 parts of di-tertiary-butyl peroxide. The reactor was cooled to the temperature of solid carbon dioxide and 50 parts of tetrafluoroethylene were added. The vessel was closed and heated to 130° C. with agitation for 3.5 hours during which time the pressure rose to 400 p.s.i. and then fell to 200 p.s.i. After cooling, the product was removed from the reaction vessel. It consisted of a thick dispersion of the white, solid wax-like solid.

Evaporation of the reaction medium left a white solid which had a crystalline melting point of 266° C. The number average molecular weight of this product was 1500. The solid showed a specific infrared ratio at 3.4 microns of 1.41 and at 10.4 microns of 1.26. Elemental analysis showed that the solid product contained 0.92% chlorine and 0.7% hydrogen.

Example XII

According to the procedure of the above example, a solution of 4.5 parts of 1,2-dimethoxyethane and 0.5 part of di-tertiary-butyl peroxide in 200 parts of 1,1,2-trichloro-1,2,2-trifluoroethane was allowed to react with 40 parts of tetrafluoroethylene at 140–160° C. The reaction was carried out at autogenous pressure. The product was a thick, white dispersion of a wax-like solid which contained 15% of the solid. Tetrafluoroethylene conversion was 80%. The solid isolated from the dispersion had a crystalline melting point of 294° C. and a number average molecular weight of 3100. It contained 0.34% chlorine, and 0.4% by weight hydrogen and exhibited specific infrared ratios at 3.4 microns of 2.16 and at 10.4 microns of 1.20.

*Example XIII*

The product formed, using the method of Example XI above, from 5 parts of diethylene glycol dimethyl ether, 200 parts of 1,1,2-trichloro-1,2,2-trifluoroethane, 0.8 part of di-tertiary-butyl peroxide, and 40 parts of tetrafluoroethylene was a dispersion of 13% of a white wax-like solid in the solvent. The tetrafluoroethylene conversion to solid product was 70%. The white solid exhibited a crystalline melting point of 282° C. and a number average molecular weight of 2200, contained 0.62% chlorine and 0.45% by weight hydrogen and exhibited specific infrared ratios at 3.4 microns of 2.27 and at 10.4 microns of 1.10.

*Example XIV*

According to the procedure of Example XI above, a solution of 1.5 parts of tetrahydrofuran and 0.8 part of di-tertiary-butyl peroxide in 200 parts of 1,1,2-trichloro-1,2,2-trifluoroethane was allowed to react for 8 hours at autogenous pressure with 40 parts of tetrafluoroethylene at 130° C. The product was a dispersion of a white, wax-like solid. The solid had a crystalline melting point of 292° C. and a number average molecular weight of 2900. It contained 0.5% by weight chlorine and 0.4% by weight hydrogen. The specific infrared ratio at 3.4 microns was 0.82 and at 10.4 microns was 0.45.

*Example XV*

A silver-lined reactor was flushed with dry nitrogen and 200 parts of 1,1,2-trichloro-1,2,2-trifluoroethane, 3.0 parts of 2,4-pentanedione, 0.5 part of di-tertiary-butyl peroxide, and after cooling to the temperature of solid carbon dioxide, 40 parts of tetrafluoroethylene were added. The vessel was closed and heated to 140° C. and shaken for eight hours under autogenous pressure. After cooling, the reaction mixture was removed and was found to consist of a dispersion of a white, solid, waxy product in the liquid reaction medium. The tetrafluoroethylene conversion to white solid was 75%. The white, waxy solid exhibited a crystalline melting point of 316° C. and a number average molecular weight of 9400. It contained 0.08% by weight of chlorine, and 0.25% by weight of hydrogen and had specific infrared ratios at 3.4 microns of 0.32 and at 10.4 microns of 0.32.

*Example XVI*

Example XV was repeated with substitution of 8 parts of gamma-valerolactone for the 2,4-pentanedione with all other reactants and reaction conditions remaining the same. The product was a dispersion of a white, waxy solid. The tetrafluoroethylene conversion was 90%. The white wax-like solid had a crystalline melting point of 311° C. and contained 0.06% by weight chlorine and 0.2% by weight hydrogen. The specific infrared ratio at 3.4 microns was 0.49 and that at 10.4 microns was 1.23. The number average molecular weight of this product was 6500.

*Example XVII*

Following the procedure of Example XV, a solution of 10 parts of isobutyric acid and 1.6 parts di-tertiary-butyl peroxide in 190 parts of 1,1,2-trichloro-1,2,2-trifluoroethane was allowed to react wtih 50 parts of tetrafluoroethylene in a pressure vessel maintained at 130° C. under autogenous pressure. After 12 hrs. the vessel was cooled to room temperature and the reaction mixture discharged. The product was a dispersion of a white, waxy solid in the 1,1,2-trichloro-1,2,2-trifluoroethane. The solid isolated from the dispersion exhibited a crystalline melting point of 311° C. The number average molecular weight of this product was 1800. The chlorine content of the solid was 0.08% by weight and the hydrogen content was 0.42% by weight; the specific ratios at 3.4 and 10.4 microns were 2.83 and 0.61 respectively. This product does not follow the Flory equation, the molecular weight was determined by end group analyses.

*Example XVIII*

A 1.43 liter stainless steel autoclave equipped with a Magna-Dash agitator unit was filled liquid full with a solution of 1,1,2-trichloro-1,2,2-trifluoroethane containing 0.3% by weight di-tertiary-butyl peroxide and 1.0% by weight diethyl phosphite. The reactor was closed and heated to 145° C. and then gaseous tetrafluoroethylene compressed to 600 p.s.i.g. was introduced into the agitated solution at a rate of 4.69 grams per minute in a continuous manner while the liquid feed solution was continuously passed into the reactor at a rate of 62 grams per minute. The reactor was kept liquid full at all times during the run. The pressure was maintained at 600 p.s.i.g. by a gradual release of product as it was formed. After the reaction mixture was essentially at equilibrium conditions, the product was formed in a conversion of 89% of the tetrafluoroethylene. As discharged from the reactor, the product was a dispersion of a white, solid, waxy material in the 1,1,2-trichloro-1,2,2-trifluoroethane containing 7.7% of the solid. The product when isolated from the dispersion had a crystalline melting point of 290° C., a number average molecular weight of 2700. The solid contained 2.45% by weight phosphorus, 1.85% by weight chlorine, and 0.5% by weight hydrogen.

*Example XIX*

One hundred twelve parts of 1,1,1-trifluoro-2,2,2-trichloroethane, 0.7 part of methylcyclohexane and 0.2 part of di-tertiary-butyl peroxide were placed in a pressure vessel. The vessel was cooled to the temperature of "Dry-Ice" and 20 parts of tetrafluoroethylene were added. The vessel was then sealed and heated at 135° C. for six and one-half hours. The internal pressure dropped from 250 p.s.i.g. to 160 p.s.i.g. during that period. After cooling, the product, comprising a dispersion of a white wax-like solid in the solvent, was removed from the vessel. The solvent was removed from a portion of the product giving a white wax-like solid having a crystalline melting point of 296° C., specific infrared ratios at 3.4 microns and 10.4 microns of 1.99 and 0.18 respectively, and a hydrogen content of 0.3% by weight. The product contained chlorine and had the usual lamellar arrangement of sheet-like crystals.

It is understood that the preceding examples, which examples are representative, may be varied within the scope of the total specification disclosure by one skilled in the art to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Wax-like, normally solid and essentially non-distillable open-chain highly crystalline reaction products of (1) one mole of tetrafluoroethylene, (2) a solution of from 0.01 to 0.6 mole of an active telogen in from 1.7 to 15 moles of trichlorotrifluoroethane and (3) from 0.05 to 3% by weight, based on said tetrafluoroethylene, of a free radical generating catalyst, said reaction products having a number average molecular weight in the range 1300 to 15,000, a crystalline melting point in the range 225° to 320° C., specific infrared ratios at 3.4 microns of from 0.05 to 3.5 and at 10.4 microns of from 0.05 to 3.0, a chlorine content of from 0.05% to 2.0% by weight, a hydrogen content of from 0.05% to 2.0% by weight and a lamellar arrangement of sheet-like crystals.

2. The product of claim 1 wherein the active telogen is methylcyclohexane.

3. The product of claim 1 wherein the active telogen is dimenthyl disulfide.

4. The product of claim 1 wherein the active telogen is diethyl ether.

5. A process for preparing wax-like, normally solid and essentially non-distillable open-chain highly crystalline reaction products of (1) tetrafluoroethylene, (2) a solution of an active telogen in trichlorotrifluoroethane and (3) a free radical generating catalyst, in which process one mole of tetrafluoroethylene is reacted with from 1.7 to 15 moles of trichlorotrifluoroethane, from 0.01 to 0.6 mole of active telogen in the presence of a free radical generating catalyst present in an amount within the range of from 0.05 to 3% by weight, based on said tetrafluoroethylene, said process reaction being carried out at a temperature of from 75° C. to 200° C. and at a pressure of from 200 to 600 p.s.i.g.

6. The process of claim 5 wherein the catalyst is di-tertiary-butyl peroxide and the reaction temperature is within the range of 130° C. to 160° C.

7. The process of claim 5 wherein the active telogen is methylcyclohexane.

8. The process of claim 5 wherein the active telogen is dimethyl disulfide.

9. The process of claim 5 wherein the active telogen is diethyl ether.

10. The product of claim 1 wherein the active telogen is methanol.

11. The product of claim 1 wherein the active telogen is triethylenediamine.

12. The product of claim 1 wherein the active telogen is 1,2-dimethoxyethane.

13. The product of claim 1 wherein the active telogen is diethylene glycol dimethyl ether.

14. The product of claim 1 wherein the active telogen is dimethyl formamide.

15. The product of claim 1 wherein the active telogen is tetrahydrofuran.

16. The process of claim 5 wherein the active telogen is methanol.

17. The process of claim 5 wherein the active telogen is triethylenediamine.

18. The process of claim 5 wherein the active telogen is 1,2-dimethoxyethane.

19. The process of claim 5 wherein the active telogen is diethyleneglycol dimethyl ether.

20. The process of claim 5 wherein the active telogen is dimethyl formamide.

21. The process of claim 5 wherein the active telogen is tetrahydrofuran.

References Cited in the file of this patent

UNITED STATES PATENTS

| | | |
|---|---|---|
| 2,600,821 | Wrightson | June 17, 1952 |
| 2,820,027 | Hanford | Jan. 14, 1958 |

FOREIGN PATENTS

| | | |
|---|---|---|
| 583,874 | Great Britain | Jan. 1, 1947 |